(12) United States Patent
Kang et al.

(10) Patent No.: US 10,666,840 B2
(45) Date of Patent: May 26, 2020

(54) PROCESSING DATA REPRESENTING IMAGES OF OBJECTS TO CLASSIFY THE OBJECTS

(71) Applicant: Hewlett-Packard Development Company, L.P., Houston, TX (US)

(72) Inventors: Jinman Kang, San Diego, CA (US); Kar-Han Tan, Sunnyvale, CA (US); David Bradley Short, San Diego, CA (US); Daniel R Tretter, San Jose, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 514 days.

(21) Appl. No.: 15/500,561

(22) PCT Filed: Jul. 31, 2014

(86) PCT No.: PCT/US2014/049308
§ 371 (c)(1),
(2) Date: Jan. 31, 2017

(87) PCT Pub. No.: WO2016/018419
PCT Pub. Date: Feb. 4, 2016

(65) Prior Publication Data
US 2017/0223235 A1 Aug. 3, 2017

(51) Int. Cl.
*G06K 9/46* (2006.01)
*H04N 5/225* (2006.01)
(Continued)

(52) U.S. Cl.
CPC ....... *H04N 5/2251* (2013.01); *G06K 9/00201* (2013.01); *G06K 9/00456* (2013.01);
(Continued)

(58) Field of Classification Search
CPC ........ H04N 5/2251; H04N 7/01; H04N 1/387; H04N 5/341; G06K 9/46; G06K 9/4652;
(Continued)

(56) References Cited

U.S. PATENT DOCUMENTS 5,758,049 A   5/1998 Johnson et al.
5,831,748 A  11/1998 Tsukada et al.
(Continued)

FOREIGN PATENT DOCUMENTS

CN   105122303   12/2015
EP     2525559   11/2012
(Continued)

OTHER PUBLICATIONS

Machine Vision Introduction, Sick IVP, Industrial Sensors, Dec. 2006, pp. 1-56 First 12 pages of 56.
(Continued)

*Primary Examiner* — Andrew M Moyer
(74) *Attorney, Agent, or Firm* — Trop Pruner & Hu PC (57) ABSTRACT

A method includes receiving data representing an image captured of an object disposed on a surface in the presence of illumination by a flash light. The technique includes processing the data to identify an object type associated with the object and further processing the data based at least in part on the identified object type.

19 Claims, 8 Drawing Sheets

(51) Int. Cl.
*G06T 1/00* (2006.01)
*G06K 9/00* (2006.01)
*G06K 9/20* (2006.01)
*H04N 1/387* (2006.01)
*H04N 5/341* (2011.01)
*H04N 7/01* (2006.01)

(52) U.S. Cl.
CPC ........... *G06K 9/00463* (2013.01); *G06K 9/20* (2013.01); *G06K 9/2027* (2013.01); *G06K 9/46* (2013.01); *G06K 9/4652* (2013.01); *G06K 9/4661* (2013.01); *G06T 1/0007* (2013.01); *H04N 1/387* (2013.01); *H04N 5/341* (2013.01); *H04N 7/01* (2013.01); *G06K 2209/40* (2013.01); *G06T 2207/10016* (2013.01)

(58) Field of Classification Search
CPC ............. G06K 9/2027; G06K 9/00463; G06K 9/00456; G06K 9/4661; G06K 9/20; G06K 9/00201; G06K 2209/40; G06T 1/0007; G06T 2207/10016
USPC ......................................................... 382/195
See application file for complete search history.

(56) References Cited

U.S. PATENT DOCUMENTS

| | | | |
|---|---|---|---|
| 5,969,795 A * | 10/1999 | Honda | H04N 1/387 355/25 |
| 6,771,838 B1 | 8/2004 | Fan | |
| 7,053,939 B2 | 5/2006 | Lin et al. | |
| 7,382,928 B2 | 6/2008 | Wong et al. | |
| 7,599,561 B2 | 10/2009 | Wilson et al. | |
| 7,710,391 B2 | 5/2010 | Bell et al. | |
| 8,121,640 B2 | 2/2012 | Russ et al. | |
| 8,199,117 B2 | 6/2012 | Izadi et al. | |
| 8,554,011 B2 | 10/2013 | Yuan et al. | |
| 8,736,583 B2 | 5/2014 | Anderson et al. | |
| 2002/0113946 A1 * | 8/2002 | Kitaguchi | G03B 21/26 353/28 |
| 2002/0145769 A1 | 10/2002 | Pollard | |
| 2005/0078092 A1 | 4/2005 | Clapper | |
| 2006/0043264 A1 | 3/2006 | Sakurai | |
| 2006/0098894 A1 | 5/2006 | Dicarlo et al. | |
| 2007/0159655 A1 | 7/2007 | Cui | |
| 2007/0262235 A1 * | 11/2007 | Pertsel | H04N 5/2354 250/208.1 |
| 2008/0018591 A1 | 1/2008 | Pittel et al. | |
| 2011/0242054 A1 | 10/2011 | Tsu | |
| 2013/0022242 A1 | 1/2013 | Cobb et al. | |
| 2013/0077236 A1 | 3/2013 | Becze et al. | |
| 2014/0176735 A1 * | 6/2014 | Short | H04N 1/00267 348/207.1 |
| 2014/0192160 A1 * | 7/2014 | Chang | G06K 9/2036 348/46 |
| 2015/0325023 A1 * | 11/2015 | Gross | G06T 11/60 382/203 |

FOREIGN PATENT DOCUMENTS

| | | |
|---|---|---|
| GB | 2372392 | 8/2002 |
| JP | 2006270580 A | 10/2006 |
| JP | 2009272799 A | 11/2009 |
| WO | WO-2013/101800 A1 | 7/2013 |

OTHER PUBLICATIONS

Shahram Izadi et al., "C-Slate: A Multi-Touch and Object Recognition System for Remote Collaboration using Horizontal Surfaces," 2007, pp. 3-10, IEEE.
XP 55656517A—Reducing Low Frequency Interference.

* cited by examiner

PROCESSING DATA REPRESENTING IMAGES OF OBJECTS TO CLASSIFY THE OBJECTS

BACKGROUND

A digital imaging system may include a digital camera that is constructed to electrically capture, or acquire, data that represents a pixel image of a given object. The camera may contain an image signal processor (ISP), which may perform various image processing functions on the acquired image data, such as functions pertaining to autowhite balancing, Bayer transformations, noise attenuation, image sharpening, and so forth.

DETAILED DESCRIPTION

Figure 1A:
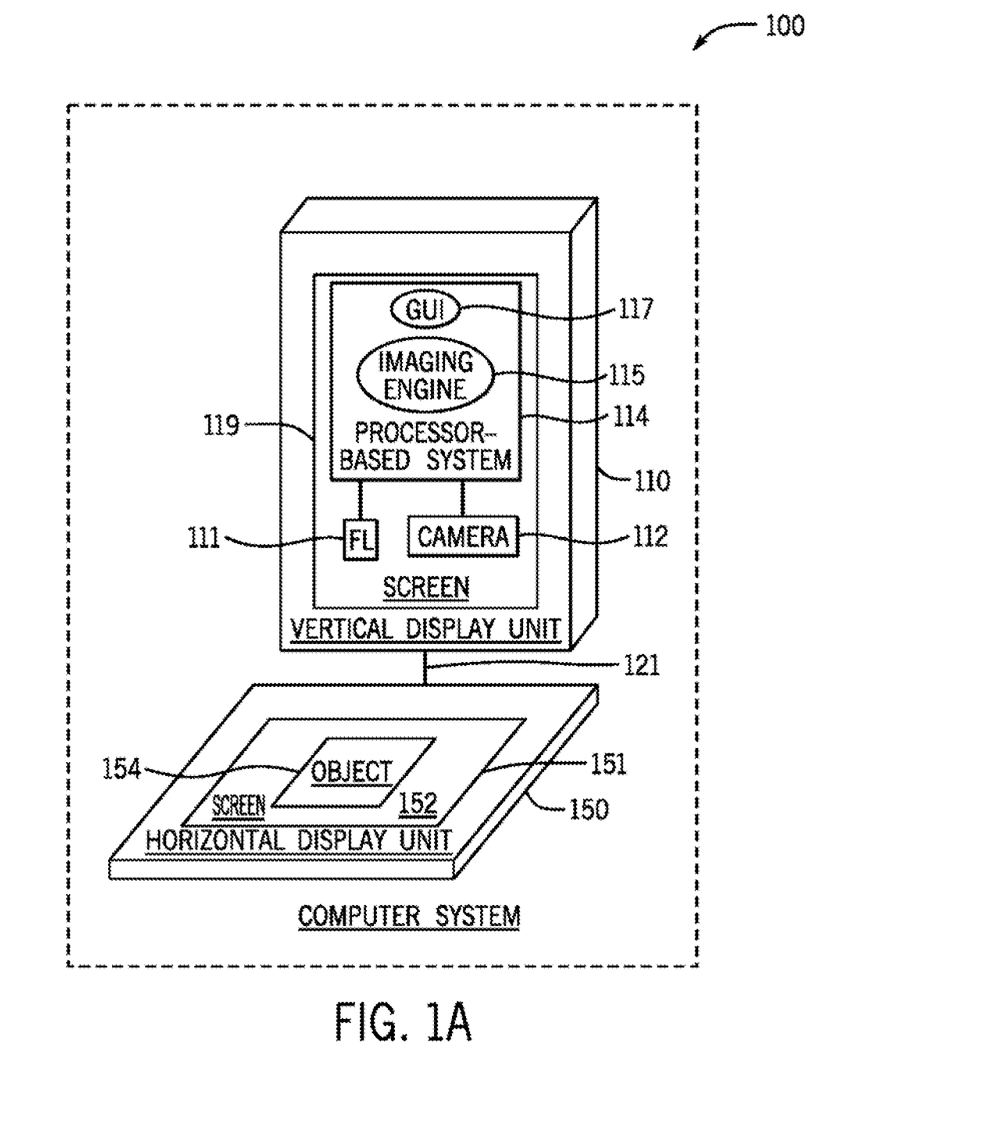
FIG. 1A is a perspective view of a computer system according to an example implementation.

Referring to FIG. 1A, in accordance with example implementations, a computer system 100, which may be used for such purposes as digital image acquisition and processing, includes dual display units: a generally vertically-disposed display unit 110 and a generally horizontally-disposed display unit 150. In this manner, the vertical display unit 110 includes a generally vertically-oriented display screen 119 for displaying icons, graphics, graphical user interface (GUI) images, multimedia content, application-generated images, and so forth. Likewise, in accordance with some example implementations, the horizontal display unit 150 may contain a generally horizontally-oriented display, or screen 151, for displaying, for example, content similar to that displayed by the vertical display unit 110.

Although electrically connected (via a wired connection 121, a wireless connection, or a combination of wired and wireless connections), the vertical display unit 110 and the horizontal display unit 150 horizontal display unit 150 may or may not be physically connected together (via a hinged connection, for example), depending on the particular implementation. In accordance with some implementations, the vertical display unit 110 may be supported on a vertically extending stand (not shown) that rests on a table, which also supports the horizontal display unit 150. Thus, many implementations are contemplated, which are within the scope of the appended claims.

In accordance with example implementations, the vertical display unit 110 and/or the horizontal display unit 150 may include components of a processor-based system, such as illustrated example processor-based system 114 that is disposed in the vertical display unit 110. Moreover, the processor-based system 110 may be electrically coupled to a built-in camera 112 of the vertical display unit 110. The camera 112 is positioned to capture, or acquire, images of objects that are placed on a surface 152, which, for this example, is formed on a region on the display screen 151 of the horizontal display unit 150. It is noted that the surface 152, in general, refers to a surface that has defined boundaries such that an object to be imaged is placed within the boundaries. The surface 152 may or not be a surface on a horizontal display unit or even a surface of an electronic device, in accordance with further example implementations. For example, in accordance with further example implementations, the surface 152 may be the surface of a mat or the surface of a table top within a certain predefined rectangular or square region of the table top.

As examples, for imaging purposes, a user may place a relatively flat, or planar, object 154 (as depicted in an example in FIG. 1A), such as a photograph or a document, on the surface 152; or the user may place a three-dimensional (3-D) object on the surface 152. The imaging of the object 154 may be used for a number of different purposes, such as acquiring a digital image of a 3-D object; storing and/or manipulating a digital image of a photograph; performing optical character recognition (OCR) of a text document or converting a document to a particular format (portable document format (pdf), for example); and so forth.

For purposes of capturing the image of the object 154, the user may position the object 154 on the surface 152 and interact with machine executable instructions, or "software," of the system 114 via a GUI (for example) to set up the camera 112 and initiate actions by the camera 112 to acquire image data representing one or multiple pixel images of the object 154. The camera 112 generally illuminates the surface 152 (and object 154) during the image capture by triggering an electronic flash unit 111 of the processor-based system 114 to generate a corresponding flash light. As an example, in accordance with example implementations, the flash unit 111 may be part of a projector (not shown) of the system 114; and the camera 112 may trigger the flash light by communicating a general purposes input/output (GPIO) signal to the projector. The flash unit 111 may be part of another component other than a projector; may be a standalone unit; may be triggered using other signals; and so forth, depending on the particular implementation.

In this manner, while the object 154 is illuminated by the flash light, the camera 112 activates its electronic shutter to acquire pixel image data in its imager(s). The camera 112 contains an image signal processor (ISP) to perform image signal processing on the data; and subsequently, the camera 112 may communicate the processed image data to the processor-based system 114, where the data may be processed to further manipulate the captured image(s).

Techniques and systems are disclosed herein for purposes of processing the image data (via post ISP processing by the processor-based system 114, for example) to compensate the image data for non-uniform illumination by the flash light and for purposes of enhancing the image data by applying processing operations that are based on a classified type of the object 154 (e.g., processing operations are selected and performed based on whether the object 154 is classified as being a 3-D object, a photograph or a document).

More specifically, in accordance with example implementations, a processor-based imaging engine 115 of the system 114 receives pixel image data that is provided by the camera 112 and performs such functions as correcting for non-uniform illumination of the surface 152 by the flash flight; identifying, or classifying the type of the object 154; and selectively performing image processing operations based on classified object type.

Figure 1B:
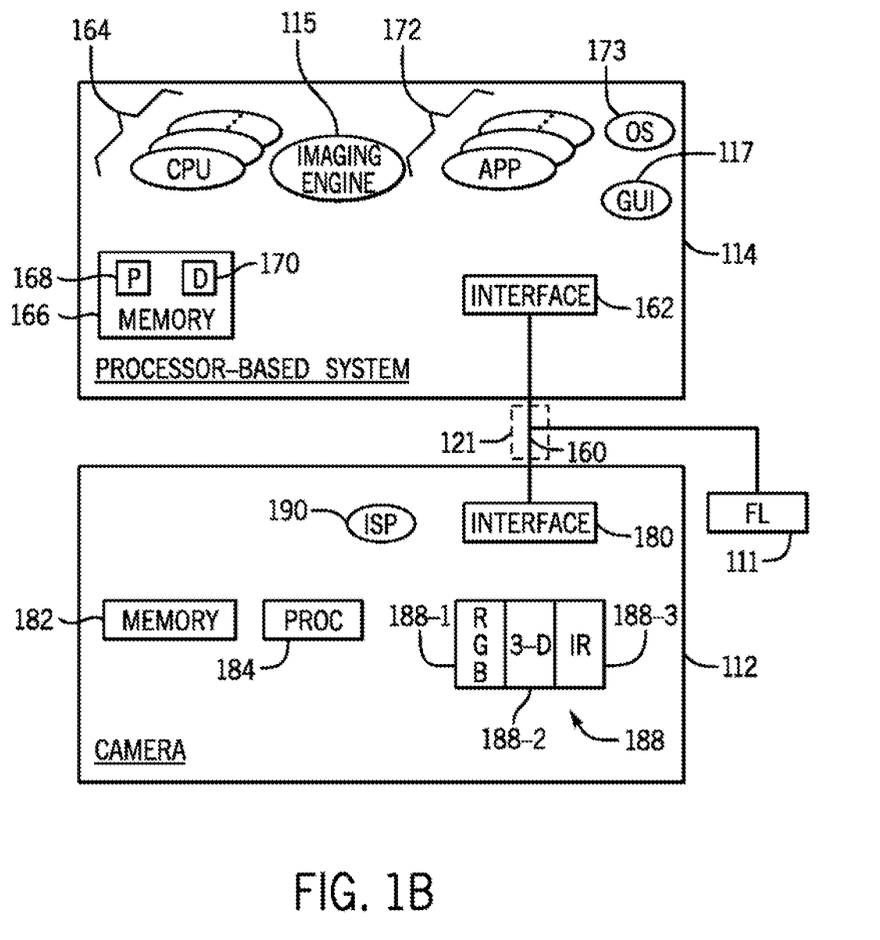
FIG. 1B is a schematic diagram of the computer system of FIG. 1A according to an example implementation.

As a more specific example, FIG. 1B depicts an electrical schematic diagram of the computer system 100 in accordance with example implementations. For these implementations, the camera 112 may include one or multiple imagers 188. For example, in accordance with some implementations, the camera 112 includes a red green blue (RGB) imager 188-1 (to capture data representing an RGB image); a 3-D imager 188-2 (to capture data representing a 3-D image); and an infrared (IR) imager 188-3 (to capture data representing an IR image). As described further herein, the imaging engine 115 (FIG. 1A) may use one or multiple images for purposes of identifying a particular class for the object 154.

In addition to the imagers 188, the camera 112 may include one or multiple processing cores 184, the flash light unit 111 and a memory 182. The memory 182 may represents the overall system memory of the camera 112 and may, for example, store data indicative of the captured image(s) as well as instructions that are executed by an image signal processor (ISP) 190 of the camera 112. In general, the ISP 190 may perform various functions to enhance the captured image, such as, for example, autowhite balancing, Bayer signal processing, gamma correction, lens distortion compensation, contrast or image sharpening, color matrix processing, lens shading, gamma correction and so forth. The camera 112 may further include, as an example, an input/output (I/O) interface 180 (a Universal Serial Bus (USB) interface, for example) 160 that communicates data (over a USB bus, for example) between the camera 112 and a corresponding I/O interface 162 of the processor-based system 114. Moreover, the I/O interface 180 of the camera 112 may communicate with the flash unit 111, as described above.

In addition to the interface 162, the processor-based system 114 includes other hardware, such as one or multiple central processing units (CPUs) 164 and a memory 166. As illustrated in FIG. 1B, the memory 166 may contain program instructions 168 for execution by the CPU(s) 164 as well as data 170 (shared image data, image data in intermediate stages of processing, final image data and so forth). Moreover, the processor-based system 114 may include various machine executable instructions, or "software," such as the imaging engine 115, device drivers, an operating system 173 and various applications 172 (an application to control the setup, image capturing, image processing parameters, and data transfer by the camera 112, as an example).

Referring to FIG. 1A in conjunction with FIG. 1B, the ISP 190 of the camera 112 assumes that the captured image is symmetrical about the camera's optical axis. However, for the computer system 100, the surface 152 may be disposed at a non-orthogonal angle with respect to the camera's optical axis. Therefore, the surface 152 may not exhibit symmetry about the camera's optical axis, which may result in imperfect illumination uniformity correction by the ISP 190. However, in accordance with example implementations, the imaging engine 115 of the processor-based system 114 provides post imaging operations that account for this asymmetry, as well as provides other enhancements, such as classifying the capture object and selecting image processing operations for the specific object type of the captured image.

Figure 2A:
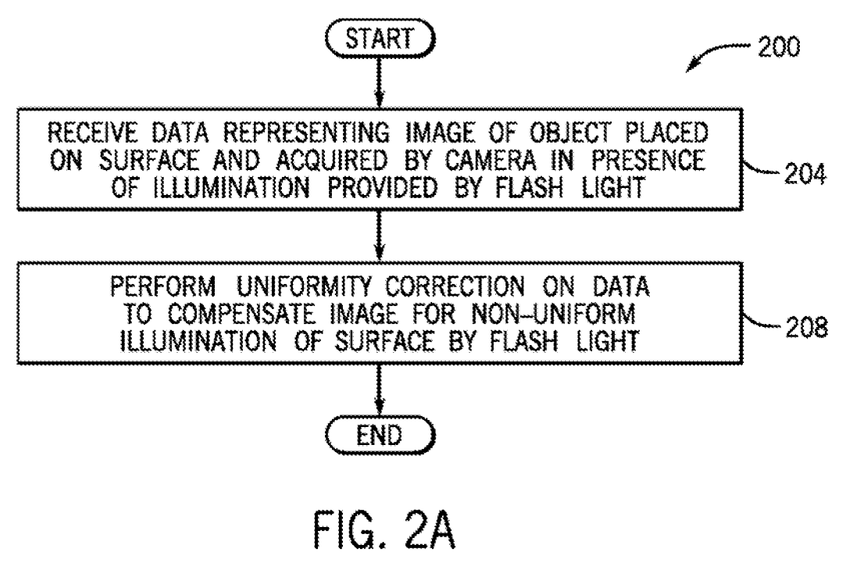
FIG. 2A is a flow diagram depicting a technique to perform illumination uniformity correction according to an example implementation.

More specifically, in accordance with example implementations, the image engine 115 performs a technique 200 that is depicted in FIG. 2A. Referring to FIG. 2A, the technique 200 includes receiving (block 204) data that represents an image of an object that is placed on a surface and is acquired by a camera in the presence of illumination provided by a flash light of the camera. The technique 200 includes performing (block 208) uniformity correction on the data to compensate the image for non-uniform illumination of the surface by the flash light.

Figure 2B:
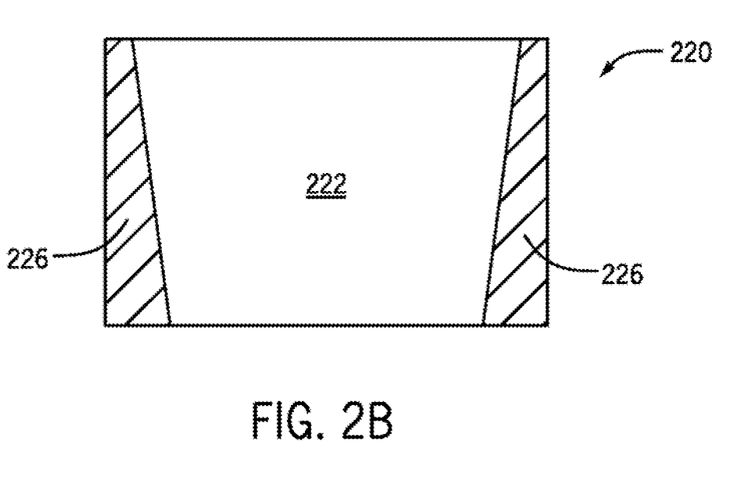
FIG. 2B is an illustration of the illumination of a surface by a flash light according to an example implementation.

In general, the intensity of light attributable to a given light source is proportional to the inverse of the distance squared from the light source. Referring to FIG. 2B, due to the above-described lack of symmetry of the surface 152 about the camera's optical axis, the camera 112 may capture an image 220 of the surface 152 when no object is present. As illustrated in FIG. 2B, although ideally such an image should be uniformly illuminated over the surface 152, the image 220 contains a region 222 in which the surface 152 is generally more illuminated and regions, such as regions 226, in which the surface is less illuminated.

For purposes of compensating for this non-uniform illumination, the imaging engine 115 applies the pixel intensities of the captured image; and for this purpose, the engine 115 may use a model that describes how the flash light illuminates the surface 152.

Figure 4:
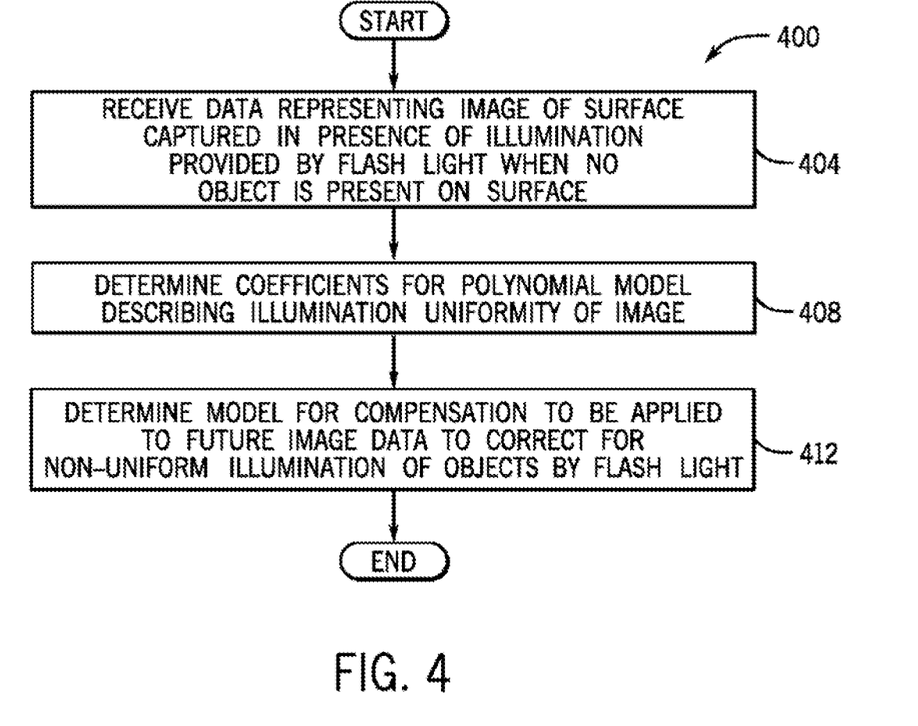
FIG. 4 is a flow diagram depicting a technique to process an acquired image to compensate for non-uniform illumination of the image by a flash light according to an example implementation.

More specifically, referring to FIG. 4, in accordance with example implementations, a technique 400 includes first capturing an image of the surface 152, without an object being present on the surface 152. In this regard, the method 400 includes receiving (block 404) data representing an image (the "base image") that is captured in the presence of illumination provided by a flash light of a camera when no object is present. This captured image, in turn, allows the non-uniform illumination to be measured and characterized so that compensation may be applied to future images containing captured objects.

In this manner, pursuant to the technique 400, coefficients are determined (block 408) for a polynomial model that describes the illumination uniformity of the captured base image. For example, in accordance with some implementations, least squares-based fitting may be used to determine the coefficients of the polynomial function that describes the Illumination. With this model, an inverse of the model may then be determined for purposes of guiding the non-uniform illumination compensation. In this regard, the technique 400 includes determining (block 412) a model for the compensation (an inverse of the determined polynomial model, for example) to be applied to future image data to correct for the non-uniform illumination.

In accordance with example implementations, the imaging engine 115 applies post processing applications to the captured image data based on an identified, or classified, object type. The object identification and applied operators occur, in accordance with example implementations, after the illumination uniformity compensation. In this regard, certain image processing operations depend on the type of object that is captured. For example, for a document, operations may be applied to sharpen, or increase the contrast, of the image so that the black text of the image is darkened and the lighter portions of the image are converted into a "page white" color. Moreover, document processing may involve snapping the corners of the document to fit a rectangular page profile. For an image of a 3-D object, shadow compensation may be applied to brighten dark regions of the image. Moreover, for the 3-D object specular compensation may be applied to soften "hot spots" of the image, such as, for example, regions of the image, which are saturated with the red color. For photographs, the degree of white enhancement, as well as an amount of saturation boost to be added, may be determined.

Figure 2C:
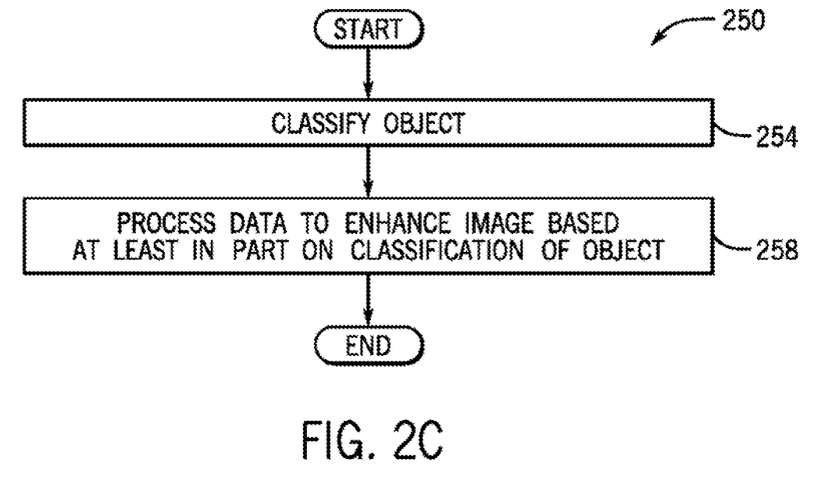
FIG. 2C is a flow diagram depicting a technique to process an image based at least in part on a type of object captured in the image according to an example implementation.

Thus, referring to FIG. 2C, in accordance with example implementations, a technique 250 includes identifying (block 254) an object type associated with an object contained in an image and processing (block 258) the image based at least in part on the identified object type. In accordance with example implementations, the image is processed to classify the object as belonging to a given object type out of a plurality of candidate object types, such as object types associated with a photograph, a document, a 3-D object, and so forth.

Figure 3:
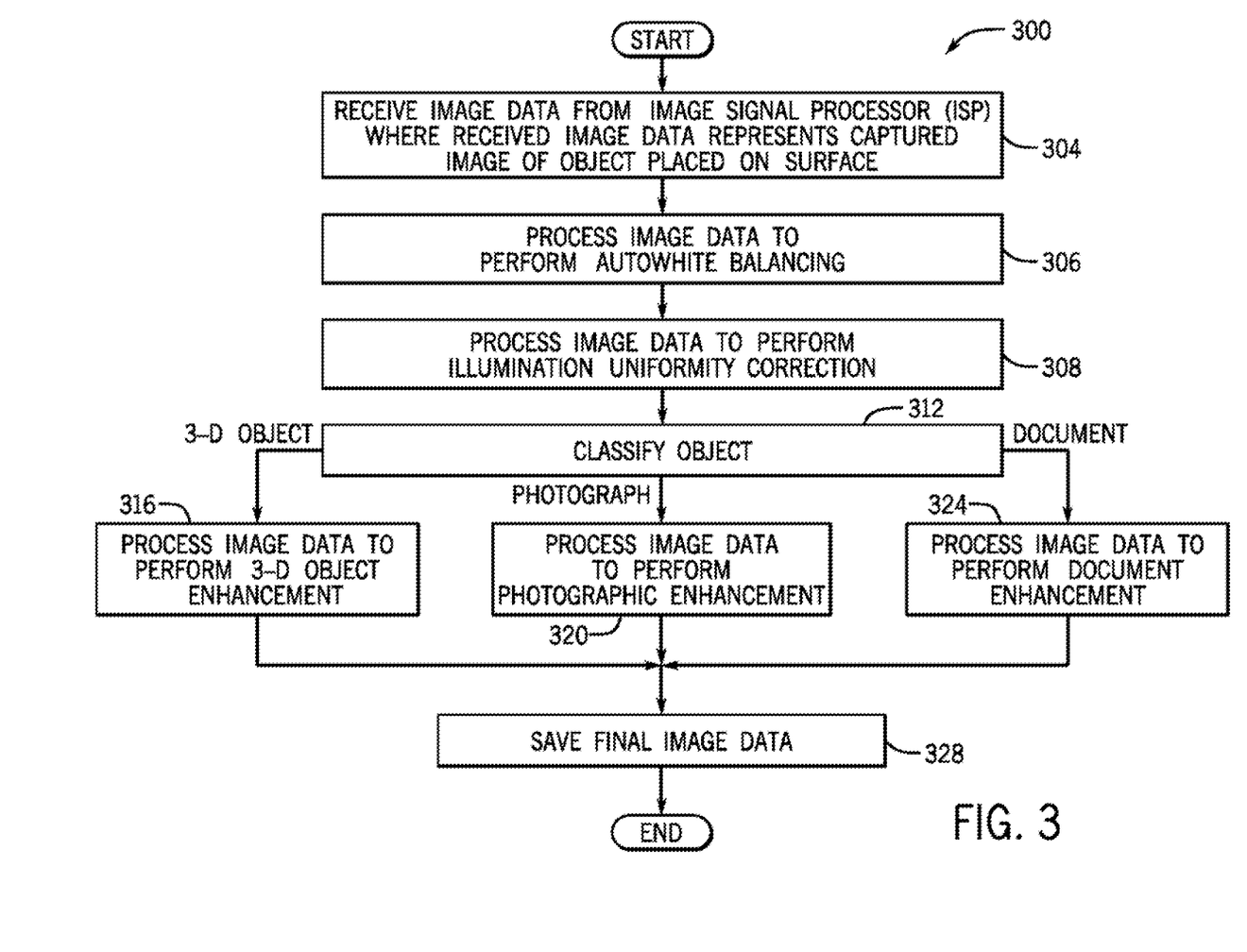
FIG. 3 is a flow diagram depicting a technique to process image data received from a camera according to an example implementation.

As a more specific example, in accordance with example implementations, the imaging engine 115 may perform a technique 300 that is depicted in FIG. 3. Referring to FIG. 3, the technique 300 includes receiving image data from an image signal processor (ISP), where the received image data is derived by capturing at least one image of an object that is placed on a surface. Pursuant to the technique 300, the imaging engine 115 may process the image data to perform autowhite balancing, pursuant to block 306. Moreover, the imaging engine 115 may perform (block 308) illumination uniformity correction on the received image. Next, the imaging engine identifies an object type, pursuant to block 312. In this manner, for a 3-D object, the engine 115 processes the image data (block 316) to perform a 3-D object enhancement. For a photograph, the imaging engine 115 processes (block 320) the image data to perform photograph enhancement for the image. Lastly, for a document type, the imaging engine 115 processes (block 324) image data to perform document enhancement for the image. Finally, the imaging engine 115 saves (block 328) the resulting final image data.

Figure 5:
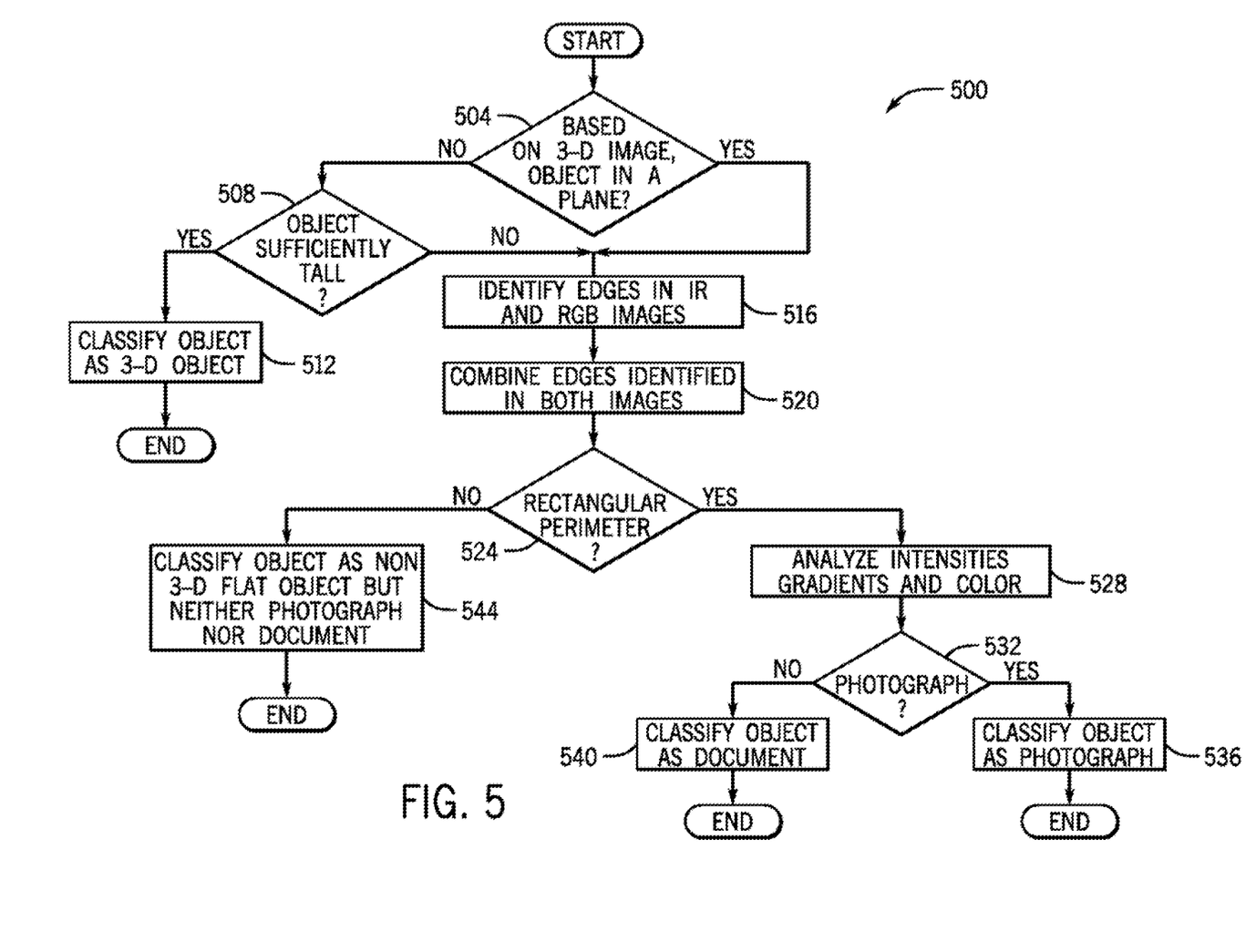
FIG. 5 is a flow diagram depicting a technique to classify an object captured in an image according to an example implementation.

Referring to FIG. 5, in accordance with example implementations, the imaging engine 115 performs a technique 500 for purposes of identifying the object type. Pursuant to the technique 500, the imaging engine 115 determines (decision block 504), based on the 3-D image, whether the object lies in a plane. If so, then the object is either a document or a photograph. Otherwise, the engine 115 determines (decision block 508) whether the object is sufficiently tall.

In this regard, in accordance with example implementations, the captured image may be associated with a certain level of noise such that an image of an entirely planar object may appear to have some height variations, and as such, may incorrectly be perceived as being non-planar. The imaging engine 115 compensates for the noise, as the engine 115 compares the measured height of the object to a threshold that accounts for the presence of noise; and based on this comparison, the imaging engine 115 determines whether to classify the object as being planar (the measured height is below the threshold, for example) or classify (block 512) the object as being a 3-D object (the measured height is at or above the threshold, for example).

If the imaging engine 115 determines that the object is planar, then the imaging engine 115 applies further processing operations, in accordance with example implementations, for purposes of determining whether the object is a photograph, document or another object type. More specifically, pursuant to the technique 500, the imaging engine 115 determines (block 516) whether edges are identified in the infrared (IR) and red green blue (RGB) images that are acquired by the camera 112.

The imaging engine 115 then combines (block 520) the identified edges in the IR and RGB images, such as through a union operation, to derive a composite image that reveals all of the identified edges. If the imaging engine 115 determines (decision block 524) that a rectangular perimeter is present in this composite image, then the imaging engine 115 applies further tests to discriminate between a photograph and a document. Otherwise, the imaging engine 115 classifies (block 544) the object as belonging to a class associated with a planar object that is neither a photograph nor a document.

For purposes of distinguishing between a document and a photograph, in accordance with example implementations, the imaging engine 115 analyzes (block 528) such factors as pixel intensities, intensity gradients and the color of the image; and based on this analysis, the imaging engine 115 determines (decision block 532) whether a photograph has been identified. If so, the imaging engine 115 classifies the object as belonging to the photograph class, pursuant to block 536. Otherwise, the imaging engine 115 classifies (block 540) the object as belonging to the document class.

Figure 6:
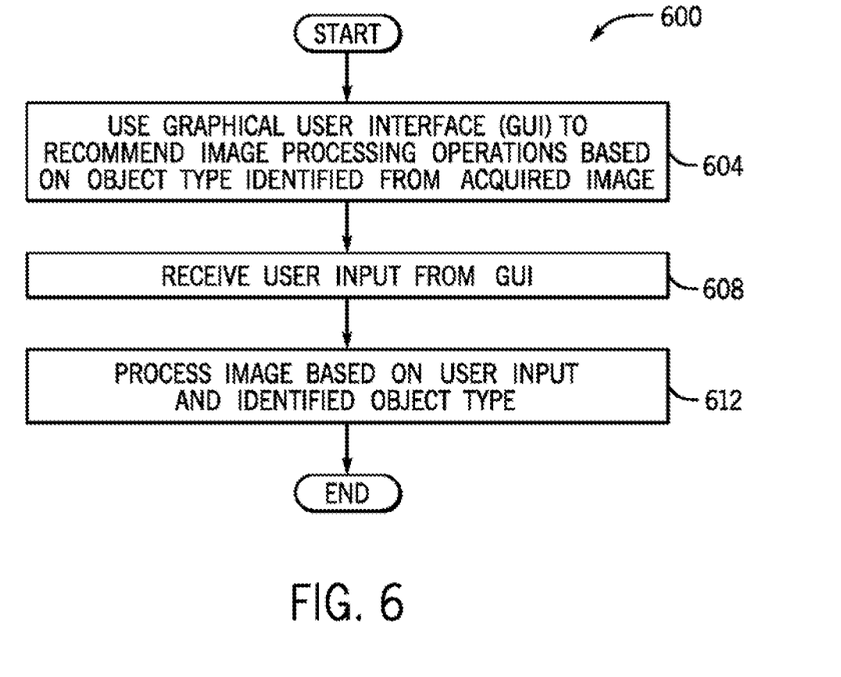
FIG. 6 is a flow diagram depicting a technique to allow a user to control image processing operations according to an example implementation.

In accordance with example implementations, a user may guide the specific post processing operations that are applied by the imaging engine 115. In this regard, pursuant to a technique 600 that is depicted in FIG. 6, the imaging engine 115 uses (block 604) a graphical user interface (GUI) 117 (see FIG. 1A) to recommend image processing operations based on the identified object type. For example, based on the identified object type, the imaging engine 115 may recommend a certain set of filters to be applied to the image so that the user may then elect whether to accept recommended application of filters, reject the recommended application of filters, or modify the filtering (select different parameters for a given recommended filter, add another filter to be applied, reject a recommend filter, and so forth).

Using the GUI 117, the imaging engine 115 receives (block 608) user input; and this input may be used to allow all of the recommended post processing operations to be applied; to restrict the set of the recommended post processing operations to be applied; to cancel one or multiple post processing operations; to select additional post processing operations that are not recommended; to modify parameters of selected post processing operations; and so forth. Based on this input, the technique 600 includes processing the image based on the user input and the identified object type, pursuant to block 612.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   receiving data representing a plurality of images captured of an object disposed on a surface; and
   processing the data in a processor-based computing system to identify an object type associated with the object, wherein processing the data to identify the object type comprises:
   determining a height of the object based on the data;

classifying the object as being planar based on the determined height;

identifying edges of the object based on the data; and based on the identified edges, classifying the object as belonging to either a first class corresponding to a photograph or a document, or a second class corresponding to a planar object other than the photograph or the document; and further processing the data based at least in part on whether the object is classified as belonging to the first class or classified as belonging to the second class.

2. The method of claim 1, wherein the receiving comprises receiving the data from a camera.

3. The method of claim 1, further comprising processing the data to compensate a given image of the plurality of images for non-uniform illumination of the surface by a flash light.

4. The method of claim 3, wherein processing the data to compensate for the non-uniform illumination comprises compensating intensity values of the given image based at least in part on a model representing illumination of the surface by the flash light.

5. The method of claim 1, wherein classifying the object as being planar based on the determined height comprises:

comparing the determined height to a height threshold associated with a noise floor; and classifying the object as being planar based on the comparison.

6. The method of claim 5, wherein:

the plurality of images comprise a composite color image and an infrared image;

identifying the edges of the object comprises identifying edges in the color composite image and identifying edges in the infrared image; and classifying the object as belonging either to the first class or the second class comprises classifying the object based on the edges identified in the color composite image and the edges identified in the infrared image.

7. The method of claim 5, further comprising:

in response to the object being classified as belonging to the first class, distinguishing between the photograph and the document based on pixel intensities and intensity gradients.

8. A system comprising:

a camera to acquire a plurality of images of an object disposed on a surface; and a processor-based engine to:

process the data to identify an object type associated with the object, wherein processing the data to identify the object type comprises:

determining a height of the object based on the data;

classifying the object as being planar based on the determined height;

identifying edges of the object based on the data; and based on the identified edges, classifying the object as belonging to either a first class corresponding to a photograph or a document, or a second class corresponding to a planar object other than the photograph or the document; and further process the data based at least in part on whether the object is classified as belonging to the first class or classified as belonging to the second class.

9. The system of claim 8, further comprising an electronic flash unit to illuminate the surface, and the engine is adapted to process the data to compensate a given image of the plurality of images for non-uniform illumination of the surface by the flash light.

10. The system of claim 8, wherein the engine processes the data to compensate for an ambient light.

11. The system of claim 8, wherein the processor-based engine compares the determined height to a height threshold associated with a noise floor, and classifies the object as being planar based on the comparison.

12. The system of claim 8, wherein:

the plurality of images comprises a composite color image and an infrared image;

the processor-based engine identifies the edges of the object by identifying edges in the color composite image and identifying edges in the infrared image; and the processor-based engine classifies the object as belonging either to the first class or the second class by classifying the object based on the edges identified in the color composite image and the edges identified in the infrared image.

13. A non-transitory computer readable storage medium to store instructions that, when executed by a machine, cause the machine to:

receive data representing a plurality of images captured of an object disposed on a surface; and process the data to identify an object type associated with the object, wherein processing the data to identify the object type comprises:

determining a height of the object based on the data;

classifying the object as being planar based on the determined height;

identifying edges of the object based on the data; and based on the identified edges, classifying the object as belonging to either a first class corresponding to a photograph or a document, or a second class corresponding to a planar object other than the photograph or the document; and further processing the data based at least in part on whether the object is classified as belonging to the first class or classified as belonging to the second class.

14. The storage medium of claim 13, wherein the instructions, when executed by the machine, further cause the machine to receive the data from a camera.

15. The storage medium of claim 13, wherein the instructions, when executed by the machine, further cause the machine to compensate a given image of the plurality of images for non-uniform illumination of the surface by a flash light.

16. The storage medium of claim 15, wherein the instructions, when executed by the machine, further cause the machine to compensate intensity values of the given image based at least in part on a model representing illumination of the surface by the flash light.

17. The storage medium of claim 13, wherein the instructions, when executed by the machine, further cause the machine to:

compare the determined height to a height threshold associated with a noise floor; and classify the object as being planar based on the comparison.

18. The storage medium of claim 13, wherein:

the plurality of images comprise a composite color image and an infrared image;

the instructions, when executed by the machine, further cause the machine to identify edges in the color composite image and identify edges in the infrared image; and the instructions, when executed by the machine, further cause the machine to classify the object based on the edges identified in the color composite image and the edges identified in the infrared image.

19. The storage medium of claim 13, wherein the instructions, when executed by the machine, further cause the machine to:
   in response to the object being classified as belonging to the first class, distinguish between the photograph and the document based on pixel intensities and intensity gradients.

* * * * *